US012763682B1

(12) United States Patent
Chinthu et al.

(10) Patent No.: US 12,763,682 B1
(45) Date of Patent: Oct. 13, 2026

(54) NON-INTEGER MULTI-STAGE NEGATIVE CHARGE PUMP WITH LOW AREA AND HIGH EFFICIENCY

(71) Applicant: GlobalFoundries U.S. Inc., Malta, NY (US)

(72) Inventors: Siva Kumar Chinthu, Bangalore (IN); Suresh Pasupula, Bangalore (IN); Abhimanue Airi, Bangalore (IN)

(73) Assignee: GlobalFoundries U.S. Inc, Malta, NY (US)

( * ) Notice: Subject to any disclaimer, the term of this patent is extended or adjusted under 35 U.S.C. 154(b) by 0 days.

(21) Appl. No.: 19/223,974

(22) Filed: May 30, 2025

(51) Int. Cl.
*H02M 3/07* (2006.01)
*H02M 1/00* (2006.01)

(52) U.S. Cl.
CPC ......... *H02M 3/071* (2021.05); *H02M 1/0003* (2021.05)

(58) Field of Classification Search
CPC ............................ H02M 3/071; H02M 1/0003
USPC ............................ 327/536
See application file for complete search history.

(56) References Cited

U.S. PATENT DOCUMENTS 8,339,183 B2 12/2012 Htoo et al.
8,461,910 B2 * 6/2013 Nadimpalli ........... H02M 3/073 363/60
8,692,608 B2 * 4/2014 Chen ....................... H02M 3/07 363/60
8,797,088 B2 * 8/2014 Chan ....................... H02M 3/07 327/540
11,569,738 B1 * 1/2023 Chinthu .................. H02M 3/07
2002/0130701 A1 * 9/2002 Kleveland ............. H02M 3/073 327/536
2006/0132417 A1 * 6/2006 Shigenobu ........... G09G 3/3696 345/98
2010/0327959 A1 12/2010 Lee
2011/0170714 A1 7/2011 Hanzlik et al.
2016/0181913 A1 * 6/2016 Feng ....................... H02M 3/07 327/536

(Continued)

OTHER PUBLICATIONS

Zhai et al., "A Design of fast-setting on-chip Charge Pump Circuit", Journal of Physics: Conference Series 2195 012034, IOP Publishing, 2022.

(Continued)

*Primary Examiner* — Ryan Jager
(74) *Attorney, Agent, or Firm* — Fleit Intellectual Property Law; Jose Gutman

(57) ABSTRACT

A multi-stage negative charge pump, method and circuit. The circuit includes an input supplying a charge-pump reference voltage (VDDW) to the negative charge pump. A plurality of stages is connected in sequence and an output of a last stage provides a negative charge pump output voltage. Each stage, except the last stage, adds negative VDDW, and the last stage adds a negative fraction of VDDW. An oscillator clock drives each stage, except the last stage. A modulated oscillator clock drives the last stage by a repeating cycle of a modulated oscillator clock, which oscillates during a first time, and stops oscillating during a second time, to generate the negative fraction of VDDW. Durations of the first and second times are defined by an output voltage from a comparator comparing a reference voltage to a voltage from a voltage divider dividing a difference between the output voltage and an LDO voltage.

20 Claims, 4 Drawing Sheets

(56) References Cited

U.S. PATENT DOCUMENTS

| | | | | |
|---|---|---|---|---|
| 2018/0102704 | A1 | 4/2018 | Achter et al. | |
| 2021/0234460 | A1* | 7/2021 | Rana | H02M 3/07 |

OTHER PUBLICATIONS

Lin et al., "Design of Multiple-Charge-Pump System for Implantable Biomedical Applications", 2018 IEEE Biomedical Circuits and Systems Conference (BioCAS), IEEE, 2018.

Wang et al., "A Self-Regulating Negative Charge Pump Using Multi-Phase Clock for Wideband ADCs", Technical Paper, 2022 IEEE International Symposium on Circuits and Systems (ISCAS), IEEE, 2022.

Wang et al., "A Self-Regulating Negative Charge Pump Using Multi-Phase Clock for Wideband ADCs", Presentation Slides, 2022 IEEE International Symposium on Circuits and Systems (ISCAS), IEEE, 2022.

* cited by examiner

Table 1

| voltage before final stage, with no load | voltage added by last stage(s) to voltage before last stage(s), with no load | negative charge pump output voltage target with no load | #stages before last stage(s), stage(s) with osc clock always ON | #stages in closed loop: last stage(s) with modulated clock | Total stages | VDDW | Ohms of resistor R1 (50uA current) | Ohms of resistor R2 (50uA current) | Max Time Duration when Comparator Output is 1 | Min Time Duration when Comparator Output is 0 | schematic point 110 is the voltage at output of stage 1 | schematic point 112 is the voltage at output of stage 2 | schematic point 114 is the voltage at input into last stage(s) | schematic point 116 is the voltage at output of last stage(s) | Capacitance (if all stages have same cap) | Capacitance (reduced cap for stage(s) before last) | % of pump cap saving (95% CP area is pump cap area) |
|---|---|---|---|---|---|---|---|---|---|---|---|---|---|---|---|---|---|
| -0.9V to -1.1V | -0.5V to -0.3V | -1.4 V | 1 | 1 | 2 | 0.9V-1.1V (1V+/-10%) | 40k | 20k | 50% | 50% | -0.9V to -1.1V | NA | -0.9V to -1.1V | -1.4V | 4pF per stage; Total = 8pF | 2pF first stage; 4pF second stage; Total = 6pF | 25 |
| -1.8V to -2.2V | -0.5V to -0.1V | -2.3 V | 2 | 1 | 3 | 0.9V-1.1V (1V+/-10%) | 58k | 20k | 50% | 50% | -0.9V to -1.1V | -1.8V to -2.2V | -1.8V to -2.2V | -2.3V | 4pF per stage; Total = 12pF | 2pF first stage/second stage; 4pF last stage; Total=8pF | 33 |
| -8.1V to -9.9V | -0.9V to -0.1 | -10 V | 9 | 2 | 11 | 0.9V-1.1V (1V+/-10%) | 212k | 20k | 45% | 55% | -0.9V to -1.1V | -1.8V to -2.2V | -8.1V to -9.9V | -10V | 4pF per stage; Total = 44pF | 2pF per stage for 1 to 9 stages; 4pF for last 2 stages; Total=26pF | 41 |

Table 2

| Max value of R | Final output voltage | Total res div voltage | R2 k ohm | R1 K ohm | V across R1 | V across R2 | Current in res div |
|---|---|---|---|---|---|---|---|
| 0.5 | -1.4V | 3 | 20 | 40 | 2 | 1 | 50uA |
| 0.5 | -2.3V | 3.9 | 20 | 58 | 2.9 | 1 | 50uA |
| 0.45 | -10V | 11.6 | 20 | 212 | 10.6 | 1 | 50uA |

FIG. 4

NON-INTEGER MULTI-STAGE NEGATIVE CHARGE PUMP WITH LOW AREA AND HIGH EFFICIENCY

BACKGROUND

The present disclosure relates to negative charge pump circuit structures, and more particularly to a multi-stage negative charge pump circuit structure with reduced chip real-estate requirement and high efficiency in generating a non-integer output voltage.

Negative charge pump circuit structures are commonly used to generate a negative voltage in low-power electronics and integrated circuits of many devices, such as mobile phones, flash memories, liquid-crystal displays, NMOS memories, and microprocessors. For example, the generated negative voltage can be applied to a circuit supporting substrate to significantly reverse bias N+ to substrate junctions, decreasing junction capacitance and increasing the speed of circuit operation. As another example, mobile devices might use charge pump circuits to support higher-power fast charging solutions, rather than buck converter circuits, to reduce the voltage and increase operating efficiency, reducing heat generation.

The size of the integrated circuit real estate (area) required to support a negative charge pump circuit structure, and the efficiency of the circuit's operation, are important parameters in product designs that affect the commercial viability of the products.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to illustrate various examples and to explain various principles and advantages all in accordance with the present disclosure, in which:

FIG. 4 includes two tables illustrating example parameter values for certain examples of negative charge pump circuits according to the present disclosure.

DETAILED DESCRIPTION

Figure 1:
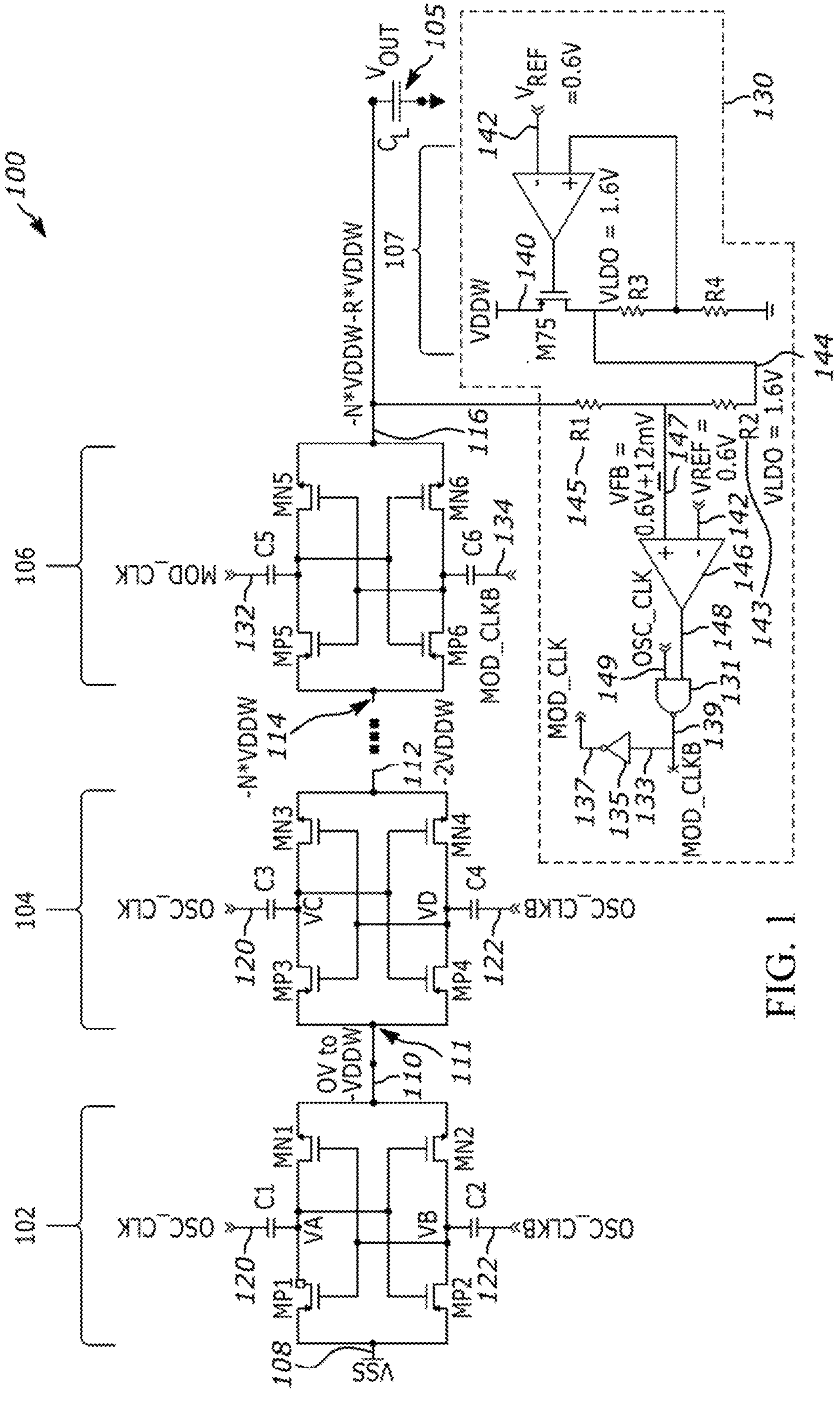
FIG. 1 is a circuit diagram showing an example of a non-integer multi-stage negative charge pump with a closed loop feedback circuit connected to a low drop-out voltage regulator, according to various embodiments of the present invention.

As required, detailed embodiments are disclosed herein; however, it is to be understood that the disclosed embodiments are merely examples and that the devices, systems, and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any proprietary detailed structure and function. Further, the terms and phrases used herein are not intended to be limiting, but rather, to provide an understandable description. Additionally, unless otherwise specifically expressed or clearly understood from the context of use, a term used herein describes the singular and/or the plural of that term.

Features and advantages of the various embodiments will become readily apparent from the following description and accompanying drawings. Certain preferred embodiments of the invention and their benefits will also become more apparent to a person of ordinary skill in the art through the description and selected examples given herein below, and through the appended claims.

All references, publications, patents, and patent applications, cited herein and/or cited in any accompanying Information Disclosure Statement (IDS), are hereby incorporated herein by reference in their entirety for all purposes.

Non-Limiting Definitions

As used herein, the terms "horizontal" or "horizontally" refer to a direction generally parallel to a surface of a circuit supporting substrate structure.

The terms "LDO", "LDO regulator", "low-dropout regulator", and the like, are intended to mean herein a low-dropout voltage regulator, which is a type of DC linear voltage regulator circuit that can operate when the supply voltage is very close to the regulated output voltage. A low-dropout regulator circuit consists of an open collector or open-drain transistor topology. The transistor circuit may be driven into saturation with the voltages available to the regulator. This allows the voltage drop from the unregulated supply voltage to the regulated output voltage to be as low as the saturation voltage across the transistor.

As used herein, the term "multiplicity", which applies to the number of stages sequentially coupled in a sequence, means at least three stages.

As used herein, "VDDW" means an external voltage supplied to the negative charge pump circuit structure.

As used herein, the terms "vertical" or "vertically" refer to a direction generally perpendicular to a surface of a substrate structure, such as perpendicular to a planar surface of a circuit supporting substrate structure.

INTRODUCTION

The present disclosure provides a multi-stage non-integer negative charge pump circuit structure which can generate an output voltage that is a negative integer multiple of a charge-pump reference voltage plus a negative fraction of the charge-pump reference voltage. The negative charge pump circuit comprises a plurality of stages electrically coupled together in a sequence, where an output of a stage is directly coupled to an input of a directly subsequent stage in the sequence. Each stage, except the last stage, at its output adds a negative integer multiple of a charge-pump reference voltage (VDDW) to a voltage at its input, and the last stage at its output adds a negative fraction of VDDW to a negative voltage at its input. The last stage is driven by a repeating cycle of a modulated oscillator clock tracking signal that, during a first time interval, oscillates at an oscillator clock rate, and during a second time interval, stops oscillating. The last stage generates a negative fraction of VDDW by modulating the oscillator clock tracking signal between a first time interval, in which the oscillator clock tracking signal is ON, and a second time interval, in which the oscillator clock tracking signal is stopped. The last stage is driven by the repeating cycle of a modulated oscillator clock tracking signal that, during a first time interval, oscillates at the oscillator clock rate, and during a second time interval, stops oscillating. A ratio of the first time interval relative to the first time interval plus the second time interval defines the negative fraction of VDDW that is added to the negative input voltage into the last stage, and thereby the negative charge pump circuit can generate a non-integer negative voltage as an output of the charge pump circuit.

Each stage of a multi-stage negative charge pump circuit structure sequentially pumps (adds) a negative fraction of the supplied external voltage VDDW to the voltage at the input of the stage. According to various embodiments, except for the last stage, each stage adds a negative integer multiple (e.g., 100%) of the supplied external voltage to the input of the stage. In certain embodiments, the last stage can pump (add) a negative non-integer fraction (less than 100%) of the supplied external voltage to the previous stage's negative output voltage. In certain embodiments, the last stage is replaced with a plurality of stages, sequentially coupled together, in which each stage in the plurality pumps (adds) a negative fraction of the supplied external voltage to the voltage at the input of the stage, and the combination of the plurality of stages can pump (add) a negative non-integer fraction of the supplied external voltage VDDW to the negative voltage at the input of the plurality of stages.

Examples of Negative Charge Pump Circuits

FIG. 1 schematically illustrates an example of a negative charge pump circuit structure, according to various embodiments of the invention. The negative charge pump circuit 100 includes a plurality of stages which in one embodiment comprises stages 102, 104, 106.

The stages 102, 104, 106 are electrically coupled in a sequence, where an output 110, 112 of a respective stage 102, 104 is directly coupled to an input 111, 114 of a directly subsequent stage 104, 106. An input 108 of the first stage 102 is electrically coupled to a ground reference voltage (VSS). An external reference voltage VDDW 140 is supplied as a clock oscillator tracking signal to stages 102, 104, 106 of the negative charge pump circuit.

VDDW is also provided to an LDO voltage regulator circuit 107 that is part of a feedback circuit arrangement 130 coupled between the output 116 of the last stage 106 and two modulated oscillator clock clocking inputs 132, 134 into the last stage 116. This feedback circuit arrangement 130 will be discussed in more detail below.

Figure 2:
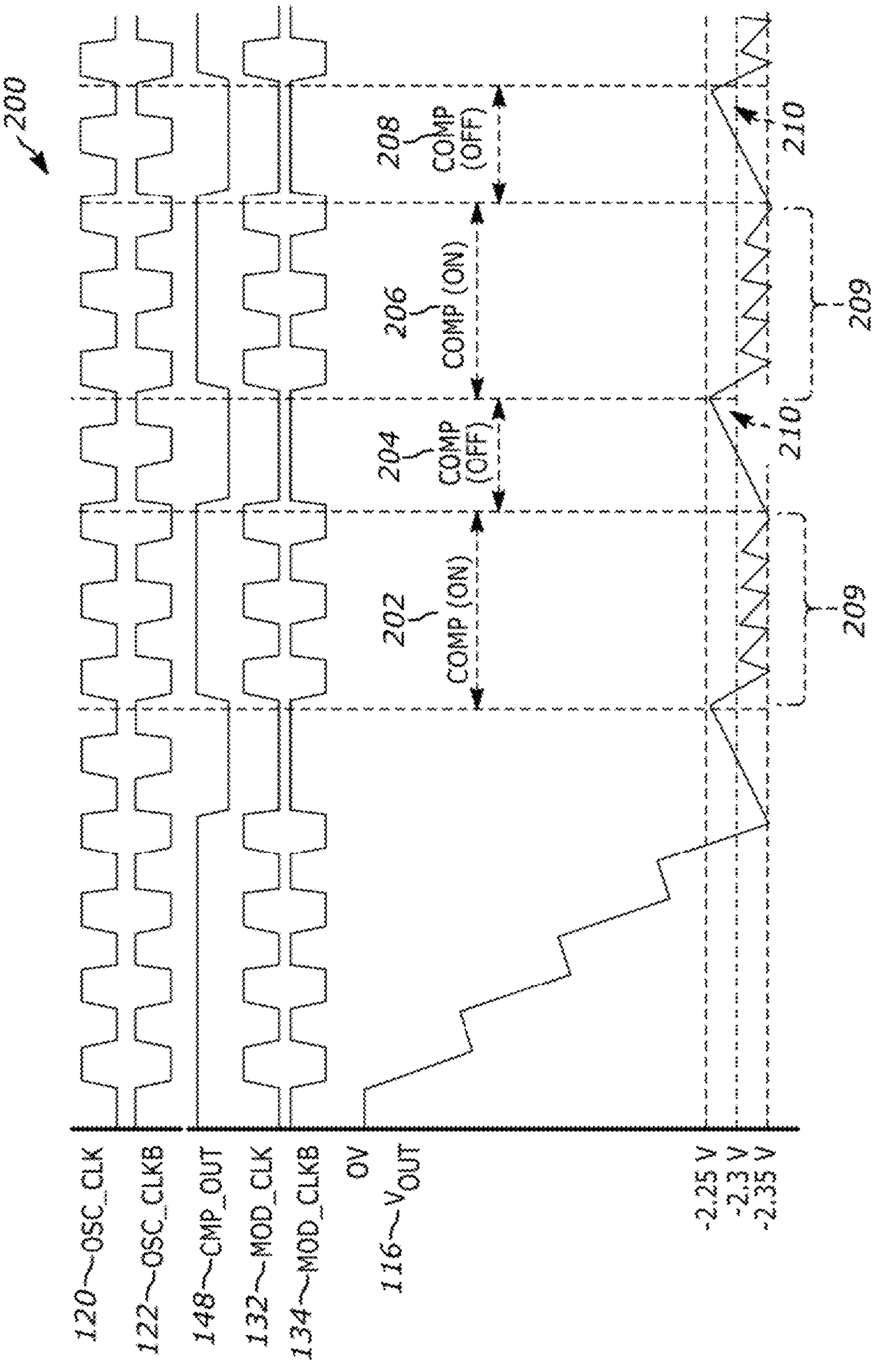
FIG. 2 is a timing diagram illustrating the timing of signals used in the example negative charge pump circuit of FIG. 1.

In the current example, each stage 102, 104, except the last stage 106, has two clocking inputs 120, 122 driven by an oscillator clock tracking signal OSC_CLK and OSC_CLKB that follow the timing of an oscillator clock. The two clocking inputs 120, 122 are alternatively driven, relative to each other, by alternating VDDW and zero volts, at the oscillator clock rate. For example, as shown in FIG. 1, in the first stage 102 and second stage 104, a first clocking input 120 would be driven to VDDW, and at the same time, a second clocking input 122 would be driven to zero volts. Then, following the oscillator clock rate, the first clocking input 120 would be driven to zero volts and the second clocking input would be driven to VDDW. The oscillator clock tracking signal OSC_CLK and OSC_CLKB, at the two clocking inputs 120, 122 of the first two stages 102, 104 would continuously alternate between VDDW and zero volts. This oscillator clock tracking signal waveform is shown in the timing diagram 200 of FIG. 2, labeled oscillator clock (OSC_CLK) 120 and oscillator clock bottom (OSC_CLKB) 122. These signal waveforms 120, 122 are shown in FIG. 2, driving the first clocking input 120 and the second clocking input 122. The second clocking input 122 is driven by the alternate voltage value at the same oscillator clock timing, as shown.

Each stage 102, 104, 106 of the example multi-stage negative charge pump circuit structure 100 sequentially pumps (adds) a negative fraction of the supplied external voltage (VDDW) to a voltage at its input, usually the previous stage's output voltage. According to various embodiments, except for the last stage 106, each stage 102, 104 adds a negative integer multiple (e.g., 100%) of the supplied external voltage (VDDW) to the voltage at the particular stage's input. Except for the first stage 102, the input 111, 114 of each stage 104, 106 would usually be the voltage at the previous stage's output 110, 112. The voltage at the input 108 of the first stage 102 will usually be the ground reference voltage VSS. In these embodiments, the last stage 106 pumps (adds) a negative non-integer fraction (less than 100%) of the supplied external voltage (VDDW) to the voltage at the input 114 of the last stage 106. The output 116 of the last stage 106 is electrically coupled to an output (e.g., an output terminal) for the negative charge pump circuit structure 100. The output terminal is shown electrically coupled to a load capacitance 105.

In certain embodiments, the total number of stages is three or more, which will be referred to herein as a multiplicity of stages 102, 104, 106 in which the last stage 106 is replaced with a last plurality of stages, sequentially coupled together, in which each stage in the last plurality of stages pumps (adds) a negative fraction of the supplied external voltage (VDDW) to the negative voltage at its input, which usually is the negative voltage at the previous stage's output. The last plurality of stages 106, in these particular embodiments, can pump (add) a negative fraction (e.g., less than 100%) of the supplied external voltage (VDDW) 140 to the negative voltage at the input 114 of the last plurality of stages 106, which usually will be the same voltage as that at the previous stage's output 112 (e.g., sequentially coupled into an input 114 of a first stage in the last plurality 106). According to these particular embodiments, the last plurality of stages 106 generates the negative fraction (e.g., less than 100%) of the supplied external voltage (VDDW) 140.

As illustrated in FIG. 4, a third row of Table 1 and Table 2, lists example circuit parameters for one example of these particular embodiments in which the negative charge pump circuit 100 includes a total of eleven (11) stages, in which the last two stages 106 generate the negative fraction voltage of the supplied external voltage (VDDW) 140, which is added to the negative voltage at the input 114 of the last two stages 106 to generate the negative voltage Vout at the output 116 of the last two stages 106.

Continuing with the example of FIG. 1, the fraction portion of the output voltage from the negative charge pump circuit 100 is generated by the last stage 106. A feedback circuit 130 provides closed-loop feedback into the last stage 106, as will be discussed below.

A voltage at an output 144 of the LDO voltage regulator circuit 107 is coupled to a resistor divider network, comprising resistors R2 143 connected to R1 145, which is coupled to the output 116 of the last stage 106. A difference in voltage between the voltage at the output 144 of the LDO voltage regulator circuit 107 and the voltage Vout at the output 116 of the last stage 106 is divided by the resistor divider network R2 143 and R1 145 to provide, at the connection of R2 143 to R1 145, a feedback voltage (VFB) at a positive input 147 of a comparator 146.

The example negative charge pump circuit shown in FIG. 1 corresponds to the first example circuit parameters in the first row of Table 1 and Table 2 (see FIG. 4). The approximate voltage at the connection of R2 143 to R1 145, which is also the feedback voltage (VFB) at the positive input 147 of the comparator 146, is 0.6V+/−12 mV, as shown in FIG. 1. A negative input 142 of the comparator 146 is set to a reference voltage 0.6V. The variability of the positive input by +/−12 mV will cause the voltage at an output 148 of the comparator 146 to alternate between ON voltage (corresponding to the first time interval) and OFF voltage (corresponding to the second time interval), as further discussed below. The first example illustrates the negative charge pump circuit 100 generating a −1.4V at the output terminal, which is also the voltage Vout at the output 116 of the last stage 106. In this example, the negative charge pump circuit includes a total of two stages. The other example parameters in row 1 are for the reader's reference on how to build the negative charge pump circuit according to the first example. However, it should be noted, from a review of the last three columns of row 1 in Table 1, the first example negative charge pump design can save approximately 25% of the area that would be otherwise occupied by larger capacitors in a conventional negative charge pump circuit. This is a significant saving in overall semiconductor circuit real estate (area) required for a negative charge pump circuit.

A second example is illustrated in Table 1 and Table 2. The second example of negative charge pump circuit parameters is shown in the second row of Table 1 and Table 2. In this example, the negative charge pump circuit includes a total of three stages. The voltage at the output of the second example negative charge pump circuit is approximately −2.3V. The other example parameters in row 2 are for the reader's reference on how to build the negative charge pump circuit according to the second example. It should be noted, however, from a review of the last three columns of row 3 in Table 1, the second example negative charge pump design can save approximately 33% of the area that would be otherwise occupied by larger capacitors in a conventional negative charge pump circuit. This is a significant saving, greater than the savings of the first example discussed above, in overall semiconductor circuit real estate (area) required for a negative charge pump circuit.

A third example is illustrated in Table 1 and Table 2. The third example of negative charge pump circuit parameters is shown in the third row of Table 1 and Table 2. In this example, the negative charge pump circuit includes a total of eleven stages. The voltage at the output of the third example negative charge pump circuit is approximately −10V. The other example parameters in row 3 are for the reader's reference on how to build the negative charge pump circuit according to the third example. It should be noted, however, from a review of the last three columns of row 3 in Table 1, the third example negative charge pump design can save approximately 41% of the area that would be otherwise occupied by larger capacitors in a conventional negative charge pump circuit. This is a very significant saving, greater than the savings of the first and second examples discussed above, in overall semiconductor circuit real estate (area) required for a negative charge pump circuit. From the three examples discussed above, a designer will understand that the larger the number of stages in a negative charge pump circuit design, the greater will be the savings in area that would be otherwise occupied by larger capacitors in a conventional negative charge pump circuit. Usually, approximately 95% of the area occupied by a negative charge pump circuit will be required for the capacitors used in the charge pump. The savings in overall real estate area used by a negative charge pump according to the examples discussed herein, will allow more circuit area for other circuit components and/or will allow more miniaturization of the overall circuit supporting substrate area used in a product. The larger numbers of smaller capacitors also can reduce the amount of heat dissipated by the capacitors in a negative charge pump circuit.

Continuing with the example of FIG. 1, the negative input 142 of the comparator 146 is coupled to a comparator reference voltage (e.g., 0.6V). A bandgap voltage reference source can provide the comparator reference voltage. This reference voltage is also coupled to a reference voltage input of the LDO voltage regulator circuit 107, as shown in FIG. 1.

The output 148 of the comparator 146 is coupled to a first input of a NAND gate 131. The second input 149 of the NAND gate 131 is coupled to the oscillator clock tracking signal (OSC_CLK) at the first clocking input 120 of the first two stages 102, 104, as shown in FIG. 1. The output 139 of the NAND gate 131 is coupled to an input 133 of an inverter 135 such that the output 137 of the inverter 135 provides a modulated oscillator clock tracking signal (MOD_CLK) at a first clocking input 132 of the last stage 106.

At the same time, the output 139 of the NAND gate 131 provides an alternate modulated oscillator clock tracking signal (MOD_CLKB) to a second clocking input 134 of the last stage 106. The modulated oscillator clock tracking signals MOD_CLK and MOD_CLKB at the two clocking inputs 132, 134 to the last stage 106 alternate relative to each other between VDDW and zero volts. FIG. 2 illustrates the signal waveforms and timing for the modulated oscillator clock tracking signals MOD_CLK and MOD_CLKB, and the voltage CMP_OUT at the output 148 of the comparator 146, according to the present example.

FIG. 2 shows several time intervals where the output 148 of the comparator 146 is either an ON voltage or an OFF voltage. In this example, the output 148 is an ON voltage when the voltage at the positive input 147 of the comparator 146 is a higher voltage than the voltage at the negative input 142 of the comparator 146. The negative input 142 is set to a reference voltage (e.g., 0.6V). In this example, the output 148 of the comparator 146 is an OFF voltage when the voltage at the positive input 147 of the comparator 146 is a lower voltage than that at the negative input 142 of the comparator 146.

During a first time interval 202, 206, the voltage at the output 148 of the comparator 146 is ON, and the NAND gate 131 allows the oscillator clock tracking signal at its input 149 to pass through to its output 139. The modulated oscillator clock tracking signal voltages MOD_CLK and MOD_CLKB, at the two clocking inputs 132, 134 of the last stage 106, oscillate, alternating between VDDW and zero volts, following the oscillator clock timing.

During a second time interval 204, 208, the voltage at the output 148 of the comparator 146 is OFF, during which the modulated oscillator clock tracking signal voltages MOD_CLK and MOD_CLKB stop oscillating and remains at approximately zero volts, as shown in FIG. 2. Specifically, when the voltage at the output 148 of the comparator 146 is OFF, the NAND gate 131 blocks the oscillator clock tracking signal at the input 149 of the NAND gate 131 from passing through to its output 139. The modulated oscillator clock tracking signal voltages MOD_CLK and MOD_CLKB at the clocking inputs 132, 134 of the last stage 106, stop oscillating and remain at approximately zero volts, as shown in FIG. 2.

During the first time interval 202, 206, the voltage Vout at the output 116 of the last stage 106 is driven to a target negative voltage by negative voltage pulses 209, during which the last stage 106 continuously adds, at the oscillator clock rate, negative voltage (VDDW) pulses 209 to a negative voltage at the input 114 of the last stage 106. The output voltage pulses 209 plus the negative voltage at the input 114 of the last stage 106, coupled to the output 116 of the last stage 106 maintain the output voltage Vout at approximately a target minimum negative voltage that, in the example, can vary by 50 mV, as shown in FIG. 2. A capacitor to ground, e.g., $C_L$, usually provided by, or in combination with, a load capacitance 105, is electrically coupled to the output 116 of the last stage 106, thereby integrating and smoothing the output voltage pulses 209 at the output 116.

During the second time interval 204, 208, the modulated oscillator clock tracking voltage signals MOD_CLK and MOD_CLKB at the two clocking inputs 132, 134 of the last stage 106, stop oscillating, according to an OFF voltage at the output 148 of the comparator 146. The two signals MOD_CLK and MOD_CLKB remain at approximately zero volts. The negative output voltage 210 (at the output 116 of the last stage 106) drifts toward zero volts, a more positive voltage, until the end of the second time interval 204, 208. At this time the voltage at the output 148 of the comparator 146 changes to ON, and the first time interval 202, 206 starts another cycle of the last stage 106 adding, at the oscillator clock rate, negative voltage (VDDW) pulses 209 to a negative voltage at the input 114 of the last stage 106 to generate a voltage Vout at the output 116 of the last stage 106.

It should be noted that the herein-discussed novel circuit topology and the modulated oscillator tracking signal timing (including a first time interval and a second time interval) is used to add a negative fraction voltage (−R*VDDW) by the last stage 106 to a negative integer voltage (−N*VDDW) at the input 114 of the last stage 106 to generate a negative non-integer voltage Vout at the output 116 of the last stage 106. The generation of the negative non-integer voltage Vout at the output 116 of the last stage 106 is very different from known negative charge pump circuits.

The negative fraction (negative ratio R) of VDDW 140, as shown at the output 116 of the last stage 106 shown in FIG. 1, can be calculated for particular designs of the negative charge pump circuits 100. This ratio R is a fraction equal to a duration of the first time interval (while the voltage at the output 148 of the comparator is ON) divided by the total of the durations of the first time interval (while the voltage at the output 148 is ON) plus the second time interval (while the voltage at the output 148 is OFF). FIG. 4 illustrates three examples of circuit parameters in the three rows in Table 1 and Table 2. The first column in Table 2 shows the maximum value of ratio R calculated for each of the three rows (i.e., the three examples).

According to various embodiments of the novel charge pump circuit discussed herein, the output 148 of the comparator 146 controls the duty cycle of (ON time vs. OFF time) for the modulated oscillator clock at the inputs 132, 134 of the last stage 106. This short feedback control loop (only to the last stage 106) can quickly change the output voltage (Vout) at the output 116. The oscillating clock signals are continuously coupled to and driving the clock inputs 120, 122 of the previous stages 102, 104.

Very differently, conventional negative charge pump circuits apply a feedback signal from the output voltage (Vout) to all stages in a plurality of sequentially coupled stages. This results in a longer, slower-responding feedback loop to change the output voltage (Vout) from the negative charge pump. The feedback signal from the output of the negative charge pump extends back to the first stage (and to all stages) to change the output voltage Vout. This is a slower responding circuit that drives an oscillator clock signal to all of the stages to change the output voltage Vout.

Figure 3:
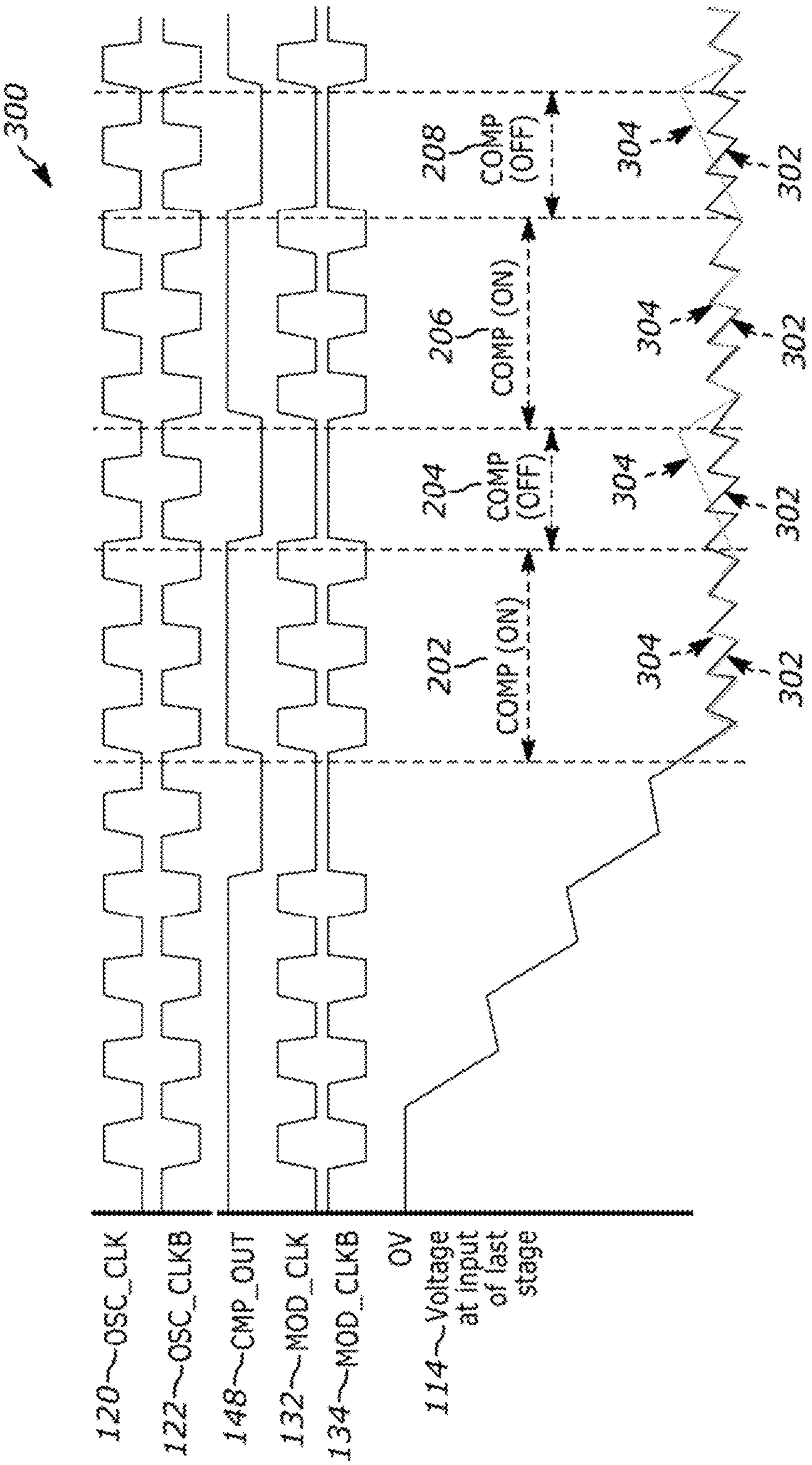
FIG. 3 is a timing diagram comparing the timing of output voltage signals in the example of FIG. 1 to the timing of output voltage signals in a conventional negative charge pump circuit.

The timing diagram 300 of FIG. 3 illustrates a comparison between the voltage pumping signal waveform 302 of the negative charge pump circuit of FIG. 1 and the voltage pumping signal waveform 304 of a prior art negative charge pump circuit.

The first waveform 302 corresponds to the voltage pumping signal at the input 114 into the last stage 106 of the novel negative charge pump circuit of FIG. 1. The voltage at the input 114 of the last stage 106 is continuously maintained oscillating at near the target integer output voltage of the negative charge pump circuit 100 shown in FIG. 1. The voltage pumping from all the previous stages 102, 104 is in response to the continuously oscillating clock signals driving the clock inputs 120, 122 of all the previous stages 102, 104, other than the inputs 132, 134 of the last stage 106.

The second waveform 304 corresponds to the voltage pumping signal at the input of the last stage of a prior art negative charge pump circuit. All stages are either driven ON by an oscillator clock signal, thereby pumping voltage from each stage to an input of a subsequent stage, or the oscillator clock signal is turned OFF. With the oscillator clock signal turned OFF, all stages stop pumping voltage, and the voltage into the input of the last stage in the sequence of stages drifts toward a more positive voltage. This is illustrated by the second waveform 304.

As discussed herein, various embodiments of the disclosed novel circuit structure 100 provide significant benefits and advantages over known prior art charge pump circuits.

For example, the feedback loop controlling the output voltage (Vout) at the output 116 of the last stage 106 is shorter and the voltage at the output 116 changes faster because the feedback loop from the output 116 only controls the last stage 106. The durations of the first time interval 202, 206 and the second time interval 204, 208 follow the voltage at the output 148 of the comparator 146. The modulated oscillator clock tracking voltage signals MOD_CLK and MOD_CLKB at the clocking inputs 132, 134 of the last stage 106 follow the timing of the oscillator clock, during the first time interval, and stop oscillating during the second time interval. The output voltage Vout at the output 116 of the last stage 106 can quickly change in response to the voltage signal at the output of the comparator 146.

In summary, according to various embodiments, each stage, except the last stage 106, at its output 110, 112 adds a negative integer multiple of a charge-pump reference voltage (VDDW) to a voltage at its input 108, 111. The last stage 106 at its output 116 adds a negative fraction (e.g., less than 100%) of VDDW to a negative integer multiple of VDDW voltage at its input 114. The last stage 106 is driven by a repeating cycle of a modulated oscillator clock tracking signal that, during a first time interval, oscillates at the oscillator clock rate, and during a second time interval, stops oscillating. The last stage generates the negative fraction of VDDW by the feedback circuit 130 modulating the oscillator clock between a first time interval, in which the oscillator clock driving signal is ON, and a second time interval, in which the oscillator clock driving signal is stopped. The last stage is driven by the repeating cycle of the modulated oscillator clock tracking signal that, during a first time interval 202, 206, oscillates at the oscillator clock rate, and, during a second time interval 204, 208, stops oscillating. The ratio of the first time interval relative to the total of the first time interval plus the second time interval defines the negative fraction of VDDW that is added to the negative integer multiple of VDDW voltage at the input 114 of the last stage 106. Thereby, the negative charge pump circuit 100 can generate a non-integer negative voltage Vout at an output 116 of the negative charge pump circuit 100.

Lastly, as discussed above, the size of the area used by charging capacitors for all previous stages 102, 104, which are sequentially before the last stage(s) 106, can be significantly reduced by, for example, 25% up to nearly 50%. The novel negative charge pump circuit 100 can save on the overall size of the area that would be otherwise occupied by larger capacitors in a conventional negative charge pump circuit. This is a significant saving in overall semiconductor circuit real estate (area) required for a negative charge pump circuit.

Non-Limiting Examples

The present invention may be implemented as a circuit, device, system, and/or a method, at any possible technical detail level of integration.

Although the present specification may describe components and functions implemented in various examples referring to particular standards and protocols, the invention is not limited to such standards and protocols. Each of the standards represents examples of the state of the art. Such standards are sometimes superseded by faster or more efficient equivalents with the same functions.

The illustrations of examples described herein are intended to provide a general understanding of the structure of various embodiments, and they are not intended to serve as a complete description of all the elements and features of apparatus and systems that might use the structures described herein. Upon reviewing the above description and the following claims, many other embodiments will be apparent to those of skill in the art. Other embodiments may be utilized and derived therefrom, such that structural and logical substitutions and changes may be made without departing from the scope of this invention. Figures are also merely representational and may not be drawn to scale. Certain proportions thereof may be exaggerated, while others may be minimized. Accordingly, the specification and drawings should be regarded in an illustrative rather than a restrictive sense. For clarity and succinctness, the components and details that are not essential to explain the scope of the invention have been omitted in the drawings.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components can communicate with one another through, for example, optical, wired, wireless, or other communications media. The terms "communicatively coupled" or "communicatively coupling" include, but are not limited to, communicating light signals and/or electronic control signals, by which one element may direct or control another. The term "configured to" describes one or more structures, or a combination of structures, that is set up, arranged, built, composed, constructed, designed or that has any combination of these characteristics to carry out a given function. The term "adapted to" describes one or more structures or a combination of structures that is capable of, able to accommodate, to make, or that is suitable to carry out a given function.

It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted herein by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The corresponding structures, materials, acts, and equivalents of all means or step plus function elements in the claims below are intended to include any structure, material, or act for performing the function in combination with other claimed elements as specifically claimed.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The examples presented herein describe various embodiments of the present invention for illustration and description, but are not intended to be exhaustive or limited to the invention in the form disclosed. Many modifications and variations will be apparent to those of ordinary skill in the art without departing from the scope of the invention. The examples were chosen and described to best explain the principles of the invention and the practical application, and to enable others of ordinary skill in the art to understand the invention for various embodiments with various modifications suited to the particular use contemplated.

What is claimed is:

1. A circuit structure, comprising:

an LDO voltage regulator for providing an LDO output voltage; and a charge pump circuit including an input terminal and an output terminal, the input terminal supplying a charge-pump reference voltage (VDDW) to the charge pump circuit and the output terminal providing a voltage output from the charge pump circuit;

a comparator circuit;

a plurality of stages electrically coupled together in a sequence, an output of a stage being directly coupled to an input of a directly subsequent stage in the sequence, wherein an output of a last stage in the sequence is electrically coupled to the output terminal; and each stage, except the last stage, is driven by an oscillator clock, and the last stage is driven by a modulated repeating cycle of the oscillator clock that varies between oscillating during a first time interval or not oscillating during a second time interval, wherein the modulated repeating cycle of the oscillator clock is controlled by an output voltage signal from the comparator circuit based on a comparison of a reference voltage to a feedback voltage from an output of a voltage divider circuit dividing a voltage difference between the output voltage of the last stage and the LDO output voltage.

2. The circuit structure of claim 1, wherein the charge pump circuit is a negative charge pump circuit, and wherein the plurality of stages is three stages, VDDW is 1 volt+/−10%, and a voltage at an output of the plurality of stages is approximately −2.3 volts.

3. The circuit structure of claim 1, wherein the first time interval is at least 50% of a total of the first time interval plus the second time interval.

4. The circuit structure of claim 1, wherein each stage, except the last stage, has first and second clocking inputs that alternate in input voltage relative to each other between a voltage of an oscillator clock tracking signal and a ground reference voltage signal.

5. The circuit structure of claim 4, wherein the last stage has first and second clocking inputs that alternate in input voltage relative to each other between a voltage of a modulated oscillator clock tracking signal and a ground reference voltage signal.

6. The circuit structure of claim 5, wherein the voltage of the modulated oscillator clock tracking signal is approximately the same voltage as the voltage of the oscillator clock tracking signal.

7. The circuit structure of claim 1, wherein the last stage includes first and second capacitors of an approximately defined size of area for generating a voltage at the output of the last stage, and each stage, except the last stage, includes first and second capacitors that are each sized approximately half, or less than half, of the approximately defined size of area, for generating a voltage at the output of each stage.

8. An integrated circuit, comprising:

a circuit supporting substrate;

an LDO voltage regulator, disposed on the circuit supporting substrate, for providing an LDO output voltage; and a negative charge pump circuit, disposed on the circuit supporting substrate, including an input terminal and an output terminal, the input terminal supplying a charge-pump reference voltage (VDDW) to the negative charge pump circuit and an LDO supply voltage to the LDO voltage regulator, and the output terminal providing a voltage output from the negative charge pump circuit;

a multiplicity of stages electrically coupled together in a sequence, including a last plurality of stages at the end of the sequence, an output of a stage being coupled to an input of a directly subsequent stage in the multiplicity, and wherein an output of the last plurality of stages in the sequence is electrically coupled to the output terminal;

each stage in the multiplicity, except the last plurality of stages, at its output adds negative VDDW to a voltage at its input, and the last plurality of stages at its output adds a negative fraction of VDDW to a negative voltage at its input, and each stage in the multiplicity, except the last plurality of stages, is driven by an oscillator clock;

the last plurality of stages at the end of the sequence is driven by a modulated repeating cycle of the oscillator clock that varies between oscillating during a first time interval or not oscillating during a second time interval; and wherein the first time interval is at least 50% of a total of the first time interval plus the second time interval, a duration of the first time interval and a duration of the second time interval are defined by an output voltage signal from a comparator circuit based on a comparison of a reference voltage to a feedback voltage from an output of a voltage divider circuit dividing a voltage difference between the output voltage of the last plurality of stages and the LDO output voltage.

9. The integrated circuit of claim 8, wherein the number of stages in the last plurality of stages is two stages.

10. The integrated circuit of claim 9, wherein the number of stages in the multiplicity of stages is eleven stages, including the two stages, VDDW is 1 volt+/−10%, and a voltage at an output of the multiplicity of stages is approximately −10 volts.

11. The integrated circuit of claim 8, wherein each stage in the multiplicity, except the last plurality of stages, has first and second clocking inputs that alternate in input voltage relative to each other between a voltage of an oscillator clock tracking signal and a ground reference voltage signal.

12. The integrated circuit of claim 11, wherein the voltage of the oscillator clock tracking signal is VDDW.

13. The integrated circuit of claim 12, wherein each stage in the last plurality of stages has first and second clocking inputs that alternate in input voltage relative to each other between a voltage of a modulated oscillator clock tracking signal and a ground reference voltage signal.

14. The integrated circuit of claim 13, wherein the voltage of the oscillator clock tracking signal and the voltage of the modulated oscillator clock tracking signal are VDDW.

15. The integrated circuit of claim 8, wherein each stage in the last plurality of stages includes first and second capacitors of an approximately defined size of area for generating a voltage at the output of the last plurality of stages, and each stage in the multiplicity of stages, except the last plurality of stages, includes first and second capacitors that are each sized approximately half, or less than half, of the approximately defined size of area, for generating a voltage at the output of the respective each stage.

16. The integrated circuit of claim 15, wherein each stage in the last plurality of stages includes first and second capacitors that are each approximately 4 ρF, and each stage in the multiplicity of stages, except the last plurality of stages, includes first and second capacitors that are each approximately 2 ρF.

17. A method for using a charge pump circuit, the method comprising:

providing a charge pump circuit comprising a plurality of stages electrically coupled together in a sequence, an output of a stage being coupled to an input of a subsequent stage in the sequence, and wherein an output of a last stage in the sequence is electrically coupled to an output of the charge pump circuit;

adding, at an output of each stage, except the last stage in the sequence, a charge-pump reference voltage (VDDW) to a voltage at an input of each stage;

adding, at an output of the last stage, a fraction of VDDW to a voltage at its input;

driving clock inputs of each stage, except the last stage, by an oscillator clock tracking signal based on an oscillator clock;

driving clock inputs of the last stage by a modulated repeating cycle of the oscillator clock that varies between oscillating during a first time interval or not oscillating during a second time interval; and wherein the first time interval is at least 50% of a total of the first time interval plus the second time interval, and a duration of the first time interval and a duration of the second time interval are defined by comparing a reference voltage to a feedback voltage which is an output voltage from a voltage divider circuit dividing a voltage difference between an output voltage of the last stage and an LDO output regulated voltage.

18. The method of claim 17, wherein the charge pump circuit is a negative charge pump circuit, and wherein each stage, except the last stage, has first and second clocking inputs that alternate in input voltage relative to each other between a voltage of an oscillator clock tracking signal and a ground reference voltage signal.

19. The method of claim 17, wherein the last stage has first and second clocking inputs that alternate in input voltage relative to each other between a voltage of a modulated oscillator clock tracking signal and a ground reference voltage signal.

20. The method of claim 19, wherein the voltage of the modulated oscillator clock tracking signal is approximately the voltage of the oscillator clock tracking signal.

* * * * *